Patented June 24, 1930

1,766,434

UNITED STATES PATENT OFFICE

HARRY GRIMMEL, OF WIESDORF-ON-THE-RHINE, AND HEINRICH CLINGESTEIN, OF COLOGNE-ON-THE-RHINE, GERMANY, ASSIGNORS TO GENERAL ANILINE WORKS, INC., OF NEW YORK, N. Y., A CORPORATION OF DELAWARE

NAPHTHO-CARBAZOLE-HYDROXY-AZO DYESTUFFS

No Drawing. Application filed June 28, 1926, Serial No. 119,196, and in Germany June 26, 1925.

The present invention relates to new azo dystuffs, and more particularly relates to azo dyestuffs which are obtainable by coupling an unsulfonated diazo compound with an unsulfonated hydroxy-naphtho-carbazole compound which may be substituted by an alkyl group or by halogen.

We have found that the aforesaid hydroxy-naphtho-carbazole compounds couple easily with unsulfonated diazo compounds and lend themselves excellently to the production of azo dyestuffs which are distinguished by very good fastness properties.

The hydroxy-naphtho-carbazoles themselves are best prepared by condensing hydrazines with naphthol or naphthylamine sulfonic acids in the presence of alkali metal bisulfite (see Bucherer, Journal für praktische chemie, Vol. 81, 1910, pages 22 and following) and replacing the sulfo group by the hydroxy group by means of an alkali melt. The 2-1-naphtho-carbazoles of the formula:

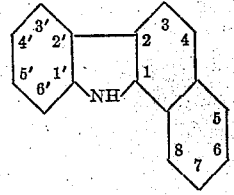

as well as the 1-2-naphtho-carbazoles of the formula:

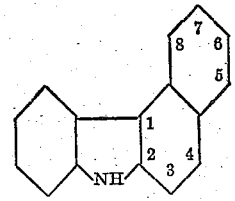

both containing the hydroxyl group in 5, 6 or 7 position, dihydroxy-naphtho-carbazoles or other substituted naphtho-carbazoles containing the substituent as well in the naphthalene as the benzene nucleus are useful for the production of our novel azo dyestuffs.

These novel dyestuffs can be produced in substance or on the fibre, and by varying the diazo compound, all possible shades can be obtained, the dyestuffs prepared on the fibre being particularly useful. The fibre material is then padded with the hydroxy-naphtho-carbazole and developed by passing through a bath of the desired diazo compound. The dyeings so obtained are particularly fast to boiling, chlorine, light, kier boiling, etc.

The azo radicle enters by this reaction into the naphthalene nucleus of the naphtho-carbazole and, by reducing the dyestuff, an aromatic amine is recovered together with an amino-hydroxy-naphtho-carbazole, in which both the amino and hydroxyl groups are attached to the naphthalene nucleus.

Our invention is further illustrated by the following examples, the parts being by weight, but it is understood that our invention is not limited to the particular substances nor reacting conditions described therein.

*Example 1.*—13.8 parts of m-nitro aniline are diazotized in the usual manner and the resulting diazo solution run into a soda alkaline solution of 23.5 parts of 7-hydroxy-2-1-naphtho-carbazole, of the formula

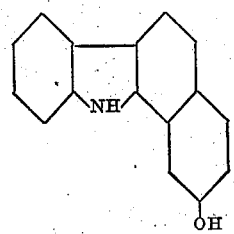

which, by addition of sodium carbonate, is kept alkaline. The dyestuff quickly forms and separates. It is isolated in the usual way. It is, when dry, a reddish-brown powder, practically insoluble in water, but soluble in concentrated sulfuric acid with a red color.

By reduction, as for example with tin chloride and hydrochloric acid, m-phenylene diamine and 8-amino-7-hydroxy-2-1-naphtho-carbazole are obtained. The dyestuff has most probably the formula:

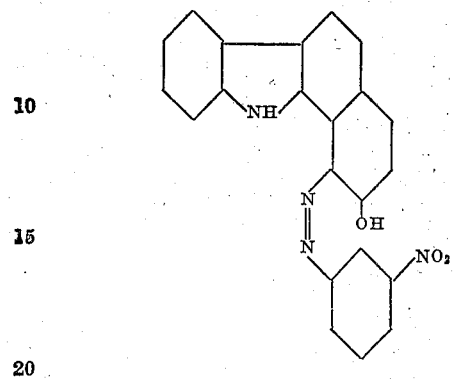

It can be produced on the fibre in the following manner:

5 parts of 7-hydroxy-2-1-naphtho-carbazole are brought to a paste, in the cold, with 7.5 parts of Turkey-red oil and from 7.5 to 10 parts of 34° Bé. caustic soda, and the resulting paste is then disolved in 500 parts of boiling water; this solution is brought to about 1000 parts by the addition of 500 parts of cold water, and 5 parts of 40% formaldehyde solution are added. Cotton goods are then padded with this solution and, after eventual drying, developed with a solution of m-diazo-nitrobenzene. The cotton goods are dyed a reddish-brown of excellent fastness to boiling, light, chlorine and kier boiling.

*Example 2.*—Cotton material is padded with a soda alkaline solution of 7-hydroxy-2-1-naphtho-bromo-carbazole obtained by brominating 7-hydroxy-2-1-naphtho-carbazole. The dyestuff is developed with a solution of 4-nitro-1-methoxy-2-diazo-benzene. The material is dyed a brownish-black of excellent fastness to boiling, chlorine, light and kier boiling.

*Example 3.*—Cotton material is padded with a soda alkaline solution of 6-hydroxy-1-2-naphtho-carbazole of the formula

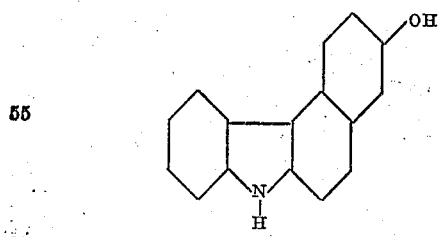

and developed with a solution of 4-nitro-1-methoxy-2-diazo benzene. The material is dyed a violet-black of good fastness to boiling, light, chlorine and kier boiling.

*Example 4.*—Cotton material is padded with a solution of 7-hydroxy-2-1-naphtho-5'-methyl-carbazole of the formula:

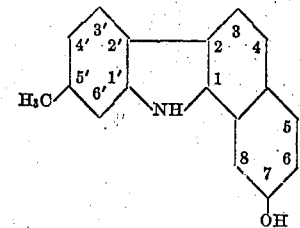

Developing with the diazo compound obtained from 4-nitro-2-toluidine a beautiful claret shade of good fastness to boiling, chlorine, light and kier boiling, is obtained.

*Example 5.*—Hydroxy-naphtho-carbazoles can also be used in calico printing. The following is an exemplification of such a procedure. The goods are padded with a solution containing in 10 liters 240 grams of 7-hydroxy-2-1-naphtho-carbazole, 300 grams of Turkey-red oil and 380 grams of 36° Bé. caustic soda. After drying they are printed with a printing paste containing thickening, aluminum sulfate and the diazo compound obtained from p-nitro-o-anisidine. The goods are then dried, washed, soaped and finished. They are printed a brownish-black of very good fastness to chlorine, washing and light.

*Example 6.*—15.2 parts of 4-nitro-2-toluidine are diazotized in the usual manner and the resulting diazo solution is run into a soda alkaline solution of 23.5 parts of 7-hydroxy-1-2-naphtho-carbazole, kept alkaline by the addition of sodium carbonate. The dyestuff separates and is isolated in the usual way. It is, when dry, a brownish-red powder, soluble in concentrated sulfuric acid with a reddish-violet color. It yields, on reduction with tin chloride and hydrochloric acid, 2-4-toluylene diamine and 8-amino-7-hydroxy-1-2-naphtho-carbazole.

*Example 7.*—By combining, in a similar manner, the diazo compound obtained from 4-nitro-2-toludine with 5-hydroxy-2-1-naphtho-carbazole a dyestuff of the probable formula:

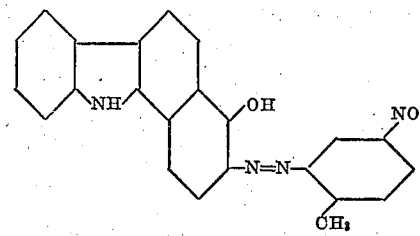

is obtained.

It is a brown powder soluble in concentrated sulfuric acid with bluish-violet color. It yields, on reduction with tin chloride and hydrochloric acid, 2-4-toluylene diamine and 6-amino-5-hydroxy-2-1-naphtho-carbazole.

*Example 8.*—By combining, in a similar manner, the diazo compound from 4-nitro-2-toluidine with 6-hydroxy-2-1-naphtho-carbazole a dyestuff of the probable formula:

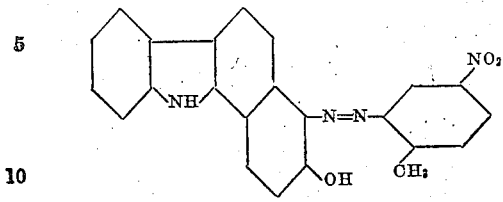

is obtained. It is in the dry state a brown powder, soluble in concentrated sulfuric acid with a brown color and yields by reduction with tin chloride and hydrochloric acid 2-4-toluylene diamine and 5-amino-6-hydroxy-2-1-naphtho-carbazole.

We claim:

1. As new products the azo dyestuffs which are obtainable by coupling an unsulfonated hydroxy-naphtho-carbazole compound which may be substituted by an alkyl group or halogen with an unsulfonated diazo compound of the benzene series containing a nitro group.

2. As new products the azo dyestuffs of the general formula:

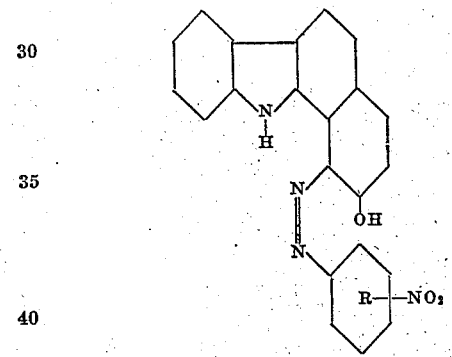

wherein R represents an unsulfonated aryl compound of the benzene series.

3. As a new product the azo dyestuff of the formula:

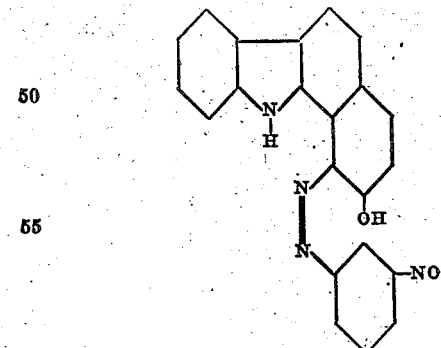

which dyestuff is, in dry form, a reddish-brown powder soluble in concentrated sulfuric acid with a red color.

4. Cotton material dyed with the azo dyestuffs obtainable by coupling an unsulfonated hydroxy-naphtho-carbazole compound which may be substituted by an alkyl group or halogen with an unsulfonated diazo compound of the benzene series containing a nitro group.

5. Cotton material dyed with the azo dyestuffs of the general formula:

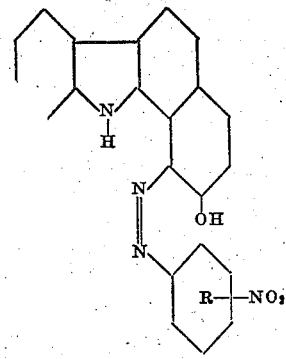

wherein R represents an unsulfonated aryl compound of the benzene series.

6. Cotton material dyed with the azo dyestuff of the general formula:

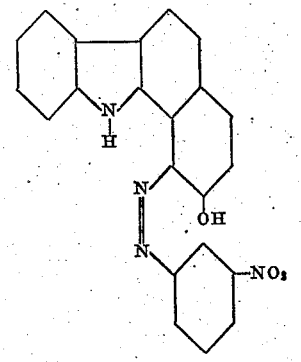

which dyestuff is, in dry form, a reddish-brown powder soluble in concentrated sulfuric acid with a red color.

In testimony whereof we have hereunto set our hands.

HARRY GRIMMEL.
HEINRICH CLINGESTEIN.